United States Patent [19]

Naitoh

[11] Patent Number: 4,769,430

[45] Date of Patent: Sep. 6, 1988

[54] POLYPYRROLE THIOPHENE

[75] Inventor: Shigeki Naitoh, Hirakata, Japan

[73] Assignees: Research Dev. Corp., Tokyo; Sumitomo Chemical Company, Osaka, both of Japan; part interest to each

[21] Appl. No.: 3,772

[22] Filed: Jan. 16, 1987

[30] Foreign Application Priority Data

Jan. 22, 1986 [JP] Japan .................................. 61-10215

[51] Int. Cl.$^4$ ........................ C08F 26/06; C08F 28/06
[52] U.S. Cl. .................................. 526/256; 204/157.7; 522/167; 522/168; 528/379
[58] Field of Search ................ 526/256; 522/167, 168; 204/157.7; 528/379

[56] References Cited

U.S. PATENT DOCUMENTS 4,521,589  6/1985  Yamamoto et al. ................ 526/256

FOREIGN PATENT DOCUMENTS 0178693  4/1986  European Pat. Off. .

Primary Examiner—Harold D. Anderson
Attorney, Agent, or Firm—Stephen F. K. Yee

[57] ABSTRACT

Disclosed are a five-membered heterocyclic compound polymer substantially constituted of repeat units represented by the following general formula:

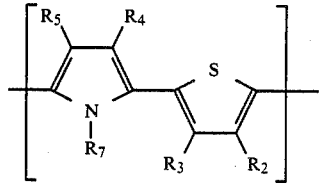

and a process for preparing the five-membered heterocyclic compound polymer described above by electrolytic oxidation of a monomer represented by the following formula in the presence of a supporting electrolyte and a solvent:

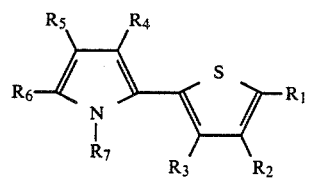

The five-membered heterocyclic compound polymer of the present invention is high in electric conductivity and stable in the air. This polymer is, therefore, utilized for electronic materials, display materials and coating materials for electric conductive substances.

2 Claims, 4 Drawing Sheets

POLYPYRROLE THIOPHENE

BACKGROUND OF THE INVENTION

(1) Technical Field

The present invention relates to a five-membered heterocyclic compound polymer having a novel structure which is useful for electronic materials and display material and the preparation thereof.

(2) Background Information

There have been proposed a process for producing a polymer composition by the electrolytic oxidation of pyrrole in the presence of a supporting electrolyte such as tetraethylammonium tetrafluoroborate (for example, Keiji Kanazawa et al., J. Chem. Soc. Chem. Comm. 854 [1979]) and a process for producing a polymer composition by the electrolytic oxidation of thiophene in the presence of a supporting electrolyte such as tetraethylammonium tetrafluoroborate (for example, Robert J. Waltman et al., J. Phys. Chem. 87, 1459 [1983]).

These compositions have high electric conductivity and are useful for electric conductive materials. Japanese Provisional Patent Publication No. 59-129827/1984 discloses that these compositions are useful also for display materials, because the light transmission spectra are clearly varied depending on whether the compositions are in the doped state or in the neutral state (namely, wherein the dopant is removed) due to their electrochemical responsiveness. Further, Japanese Provisional Patent Publication No. 58-196233/1983 discloses a process for producing a polymer composition by the electrolytic oxidation of 2,2'-thienylpyrrole or 2-(2-pyrrolyl)thiophene as a raw material.

Polypyrrole (pyrrole polymer composition) has, however, a reduction potential of −0.3V, which is more negative than that of the oxygen molecule which is −0.2V. Consequently, the stability of polypyrrole in the neutral state in the air is not good, because polypyrrole is oxidized by oxygen. Polythiophene (thiophene polymer composition) has an oxidation potential of about 1.0V, which is near to that of water molecule which is +1.2V. As a result, polythiophene is easily reduced by moisture in the air. It is, therefore, difficult to maintain the high electric conductivity in the air, resulting in difficulty for its practical use.

Also, with respect to their use for display materials, the instability described above causes a low cycle life of only about $10^6$ cycles, whereas the level required for practical use is more than $10^7$ cycles. In the present situation, therefore, it is difficult to use them in practice.

The polymer composition obtained by the electrolytic oxidation of 2,2'-thienylpyrrole or 2-(2-pyrrolyl)thiophene contains perchlorate ions as the dopant, because magnesium perchlorate is employed therein as a supporting electrolyte. Nevertheless, this polymer composition shows only a low electric conductivity of $2.6 \times 10^{-1}$ $(\Omega \cdot cm)^{-1}$, compared with that of polypyrrole and polythiophene which contain the perchlorate ions. This phenomenon is considered to result from such a structural defect of this polymer composition as the bond at the 3- and 4- positions, not at the 2- and 5- positions, compared with polypyrrole or polythiophene (Japanese Provisional Patent Publication Nos. 58-187432/1983, 58-196232/1983, 58-213027/1983, 59-51918/1984, 59-191727/1984, 59-207931/1984, 59-207932/1984 and 59-210947/1984).

SUMMARY OF THE INVENTION

The present inventor has diligently studied to solve the problems described above. As a result, it has been found that a heterocyclic compound polymer constituted of particular repeat units wherein a thiophene ring is bonded to a pyrrole ring at particular positions includes the minor structural defect, differing from the known compositions described above, and thereby the foregoing problems can be solved, thus arriving at the present invention.

In accordance with the present invention, there are provided a five-membered heterocyclic compound polymer substantially constituted of repeat units represented by the following general formula wherein a thiophene ring is directly bonded to a pyrrole ring at the 2- and 2'- positions, respectively:

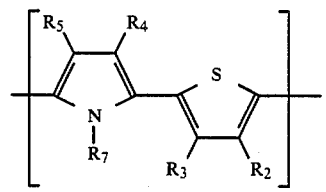

wherein each of $R_2$, $R_3$, $R_4$, $R_5$ and $R_7$ is selected from the group consisting of H, alkyl, halogen, hydroxyl, carboxyl or a salt thereof, aryl and aralkyl groups; and a process for preparing the five-membered heterocyclic compound polymer described above by electrolytic oxidation of a monomer represented by the following formula in the presence of a supporting electrolyte and a solvent:

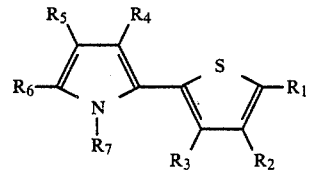

wherein each of $R_1$ and $R_6$ is selected from the group consisting of H, carboxyl group or a salt thereof, and each of $R_2$, $R_3$, $R_4$, $R_5$, and $R_7$ is selected from the group consisting of H, alkyl, halogen, hydroxyl, carboxyl, ether, aryl and aralkyl group.

DESCRIPTION OF THE PREFERRED EMBODIMENTS

Figure 1:
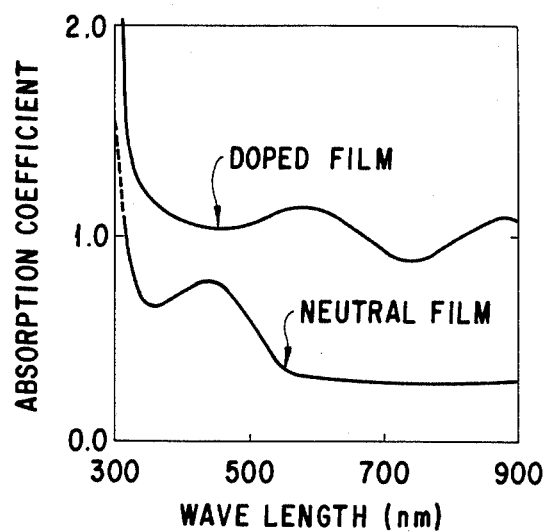
FIG. 1 shows ultraviolet absorption spectra of the polymer according to the present invention obtained in Example 1.

Although each of the foregoing groups is not particularly limited so long as it is in the scope described above, the alkyl group may include, for example, pentyl, hexyl, heptyl and octyl groups which have at least 5 carbon atoms, as well as a lower alkyl group having 1 to 4 carbon atoms such as methyl, ethyl, propyl or butyl group. The halogen group is Cl, Br or F. The salt of carboxyl group is, for example, a sodium, potassium or ammonium salt. As the ether group, there can be mentioned, for example, an alkoxy group such as a methoxy, ethoxy, propoxy or butoxy group, an aryloxy group such as a phenoxy or benzyloxy group, and a group having an ether group in the molecule such as 2-methoxy-ethyl group. The aryl group includes a substituted or unsubstituted aromatic hydrocarbon group such as a phenyl, chlorophenyl or tolyl group. As the aralkyl group, there can be mentioned a benzyl group or the like.

As the polymer according to the present invention, there can be mentioned poly (2,2'-thienylpyrrole), poly (4-methyl- 2,2'-thienylpyrrole), poly (4-ethyl-2,2'-thienylpyrrole), poly (4'-methyl-2,2'-thienylpyrrole), poly (4'-ethyl-2,2'-thienylpyrrole), poly (4,4'-dimethyl-2,2'-thienylpyrrole), poly (4,4'-diethyl-2,2'- thienylpyrrole) poly (4-chloro-2,2'-thienylpyrrole), poly (4-bromo-2,2'-thienylpyrrole), poly (4-methoxy-2,2'-thienylpyrrole), poly(4-ethoxy-2,2'- thienylpyrrole) and poly (4-phenyl-2,2'-thienylpyrrole).

In the present invention, a compound represented by the following formula is used as a monomer:

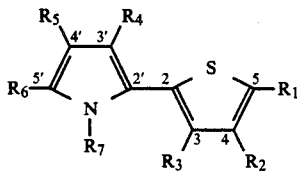

wherein $R_1$ and $R_6$ represent H, carboxyl group or a salt thereof, and $R_2$, $R_3$, $R_4$, $R_5$ and $R_7$ represent H, an alkyl, halogen, hydroxy, carboxyl, ether, aryl or aralkyl group.

With respect to these groups, $R_1$ and $R_6$ are preferable to be H, or carboxyl group or a salt thereof, but $R_2$, $R_3$, $R_4$, $R_5$ and $R_7$ are not particularly limited.

As these monomers, for example, there can be mentioned 2,2'-thienylpyrrole, when $R_1$, $R_2$, $R_3$, $R_4$, $R_5$, $R_6$ and $R_7$ are H; 4- methyl-2,2'-thienylpyrrole or 4-ethyl-2,2'- thienylpyrrole, when $R_1$, $R_3$, $R_4$, $R_5$, $R_6$ and $R_7$ are H, and $R_2$ is $CH_3$ or $C_2H_5$; 4'-methyl-2,2'-thienylpyrrole or 4'-ethyl-2,2'-thienylpyrrole, when $R_1$, $R_2$, $R_3$, $R_4$, $R_6$ and $R_7$ are H, and $R_5$ is $CH_3$ or $C_2H_5$; 4,4'- dimethyl-2,2'- thienylpyrrole or 4,4'-diethyl- 2,2'-thienylpyrrole, when $R_1$, $R_3$, $R_4$, $R_6$ and $R_7$ are H, and $R_2$ and $R_5$ are $CH_3$ or $C_2H_5$; 4-chloro-2,2'-thienylpyrrole, when $R_1$, $R_3$, $R_4$, $R_5$, $R_6$ and $R_7$ are H, and R2 is Cl; 4-bromo-2,2'-thienylpyrrole, when $R_1$, $R_3$, $R_4$, $R_5$ $R_6$ and $R_7$ are H, and $R_2$ is Br; 4-methoxy-2,2'-thienylpyrrole or 4-ethoxy 2,2'-thienylpyrrole, when $R_1$, $R_3$, $R_4$, $R_5$, $R_6$ and $R_7$ are H, and $R_2$ is $OCH_3$ or $OC_2H_5$; and 4-phenyl-2,2'- thienylpyrrole, when $R_1$, $R_3$, $R_4$, $R_5$, $R_6$ and $R_7$ are H, and $R_2$ is $C_6H_5$.

These compounds are easily available, but can also be obtained, for example, by the following process: a thenoylallylamide compound represented by the general formula

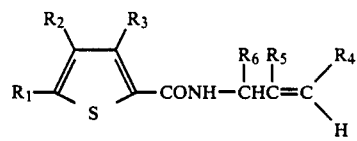

is converted into an imidoyl chloride derivative by the use of a suitable reagent such as phosgene or triphenylphosphine dichloride, and then 1,5-dipole cyclization reaction takes place by the treatment of a strong base such as t-butoxy potassium.

The five-membered heterocyclic compound polymer of the present invention is mainly obtained by the electrolytic oxidation of the monomer described above in the presence of a supporting electrolyte and a solvent (having high dielectric constant).

The supporting electrolyte includes various compounds such as, for example, an organic quarternary ammonium salt, an inorganic salt, a protonic acid and an ester. As the organic quarternary ammonium salt, there can be mentioned, for example, tetraethylammonium tetrafluoroborate, tetra-n-butylammonium tetrafluoroborate, tetraethylammonium perchlorate, tetra-n-butylammonium perchlorate, tetraethylammonium p-toluenesulfonate, tetra-n-butyl-ammonium p-toluenesulfonate, tetraethyl-ammonium hydrogensulfate, tetra-n-butyl-ammonium hydrogensulfate, tetraethylammonium hexafluorophosphate, tetra-n-butylammonium hexafluorophosphate, tetra-ethylammonium trifluoromethane-sulfonate and tetra-n-butyl-ammonium trifluoromethane-sulfonate. The inorganic salt includes lithium, sodium, barium and silver salts having the anion parts described above. As the protonic acid, sulfuric acid and nitric acid are mentioned. The foregoing supporting electrolyte and monomer are dissolved in a solvent such as water, acetonitrile, propylene carbonate, dimethyl sulfoxide, N-methylpyrrolidone, nitrobenzene, nitromethane N,N-dimethylacetamide, N,N-dimethylformamide, hexamethyl-phosphoramid, methylene chloride, pyridine and tetrahydrofuran in concentrations of 0.01M to 1M, respectively. In the solution thus obtained, the electric current is passed through electrodes of an electric conductive metal such as platinum, or conductive glass coated with an electric conductive metal oxide thereon, applying an interelectrode voltage of not more than 100V, preferably not more than 50V and a current density within the range of 0.01 to 10 $mA/cm^2$, whereby the polymer of the present invention can be obtained. When the electrolytic polymerization conditions, for example an interelectrode voltage and a current density, outside the ranges described above are applied, there can not be obtained the polymer which has the repeat structural units specified in the present invention and is structurally regular.

Namely, in the prior process such as the process described in Japanese Provisional Patent Publication No. 58-187432/1983 and the like, such a severe condition as an interelectrode voltage of 200V is used. As a consequence, the regularity in the polymerization reaction may be disintegrated to cause a lowering of the electric conductivity. In contrast, the electrolytic polymerization conditions according to the present invention produce the polymer having the regular structure and the high electric conductivity as described above.

While the polymer of the present invention usually contains the dopant, it can be easily converted to the neutral state electrochemically or chemically. Therefore, the polymer of the present invention may or may not contain the dopant.

The polymer of the present invention can be mainly obtained by the electrolytic oxidation polymerization. However, the polymer can also be obtained by oxidizing the monomer with an oxidizing material such as hydrogen peroxide, nitric acid, lead dioxide, ferric chloride, quinone, a diazonium salt, ozone or potassium persulfate, or by allowing vapor of the monomer to contact with the polymer film containing the oxidizing material described above, because the monomer is easily oxidizable.

The polymer of the present invention is the five-membered heterocyclic compound polymer having the monomer (or repeat) units as main constituents wherein the thiophene ring is directly bonded to the pyrrole ring at the 2- and 2'-positions, respectively, and the novel composition different from the conventional compositions. This polymer which shows an absorption maximum ($\lambda$max) of 420 to 480 nm in the neutral state) wherein the dopant is removed, is remarkably high in electric conductivity and stable in air. This polymer is, therefore, utilized for electronic materials such as electronic devices, stable display materials or coating materials for electric conductive substances.

The present invention will now be described in detail with reference to the following examples that by no means limit the scope of the invention.

EXAMPLE 1

Figure 2:
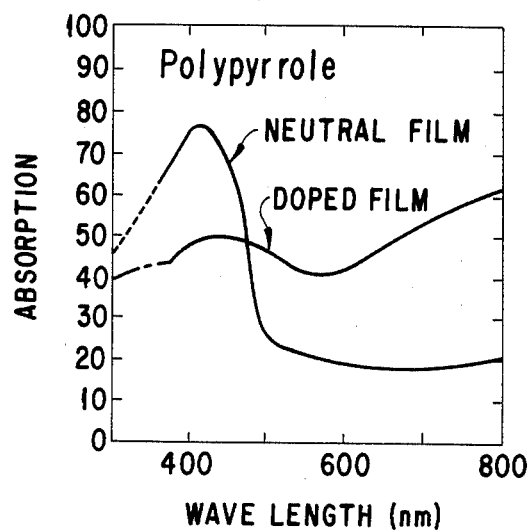
FIGS. 2 and 3 show ultraviolet absorption spectra of polypyrrole and polythiophene, respectively.
Figure 3:
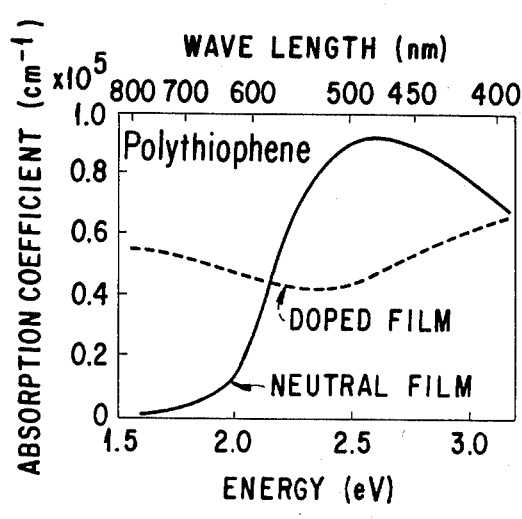

A nitrobenzene solution of 2,2'-thienylpyrrole and tetra-n-butylammonium hydrogensulfate, prepared in concentrations of 0.03M and 0.1M, respectively, was placed in the anode side of a two-compartment electrolytic cell, and a nitrobenzene solution containing tetra-n-butylammonium hydrogensulfate in a concentration of 0.1M was placed in the cathode side. Then inert gas (nitrogen, argon or helium) was introduced therein. As an anode, the glass electrode (supplied by Asahi Glass Co., Ltd., hereinafter referred to as ITO electrode for brevity) was used which was manufactured by evaporating the oxides of indium and tin onto glass surface and had a electric conductivity of about 200 $\Omega/cm^2$, and as a cathode, a platinum plate was used. The electrolytic oxidation was conducted under the conditions that the interelectrode voltage is 6V and the current density is 1.0 mA/cm$^2$. After a quantity of electricity of 60 mC/cm$^2$ was passed, a blue-purple film-form composition was obtained on the anode. This composition was cut off to a width of about 8 mm in the state in which the composition adhered to the ITO electrode (hereinafter refered to as electrode A for brevity, the ITO electrode to which the residual composition adhered is refered to as electrode B for brevity). An ultraviolet absorption spectrum obtained after washing with acetonitrile is shown in FIG. 1 as a doped film. Using the electrode A as a cathode and a platinum plate as an anode, the electrolytic reduction was carried out in an acetonitrile solution containing tetra-n-butylammonium hydrogensulfate in a concentration of 0.1M. Consequently, a yellow-orange composition was obtained. An ultraviolet absorption spectrum of this composition is shown in FIG. 1 as a neutral film. FIGS. 2 and 3 show examples of ultraviolet absorption spectra for polypyrrole and polythiophene, respectively. By comparison of the spectra of the neutral films, polypyrrole and polythiophene exhibit their absorption maxima ($\lambda$ max) at 420 nm and 480 nm, respectively. In contrast, poly (2,2'-thienylpyrrole) shows its absorption maximum ($\lambda$ max) at 460 nm. It is understandable from this fact that poly (2,2'-thienylpyrrole) has a structure wherein a thiophene ring is directly bonded to a pyrrole ring at the 2- and 2'- positions, respectively, as shown in the claim, and is a polymer substantially constituted by the repeat units described above.

Using the electrode B obtained above as an anode, the electrolytic oxidation was further continued in the same solution, until a quantity of electricity of 6 C/cm$^2$ was passed therein. A purple film-form composition thus obtained was peeled from the ITO electrode in methanol, washed with methanol and then dried in vacuo for a day, and then cut into two pieces of film 20 mm long and 5 mm wide as samples for electric conductivity measurement. The electric conductivity of the samples was measured by the four probe technique at 25° C. An averaged value of 3.3 ($\Omega \cdot$cm)$^{-1}$ was obtained.

As a result of elemental analysis, the mole ratio of carbon:hydrogen:nitrogen:sulfur was 8:5.86:1.04:1.44.

Figure 4:
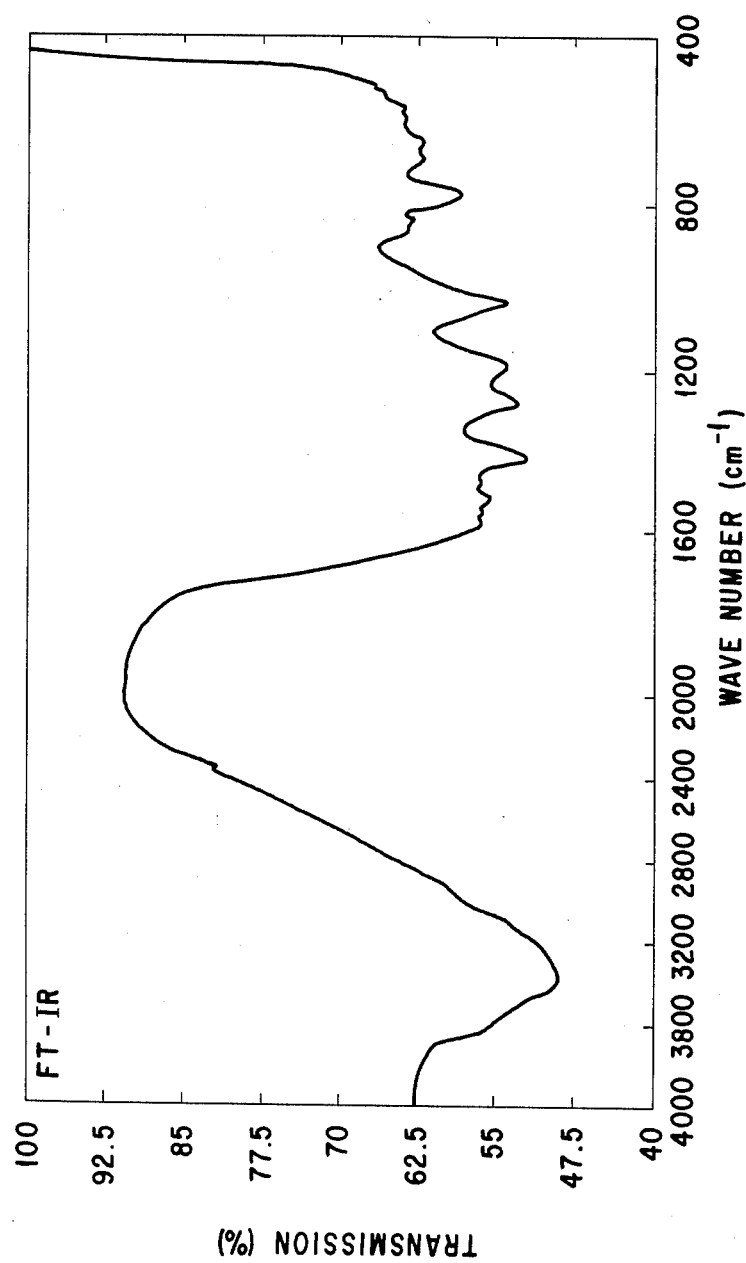
FIG. 4 shows an infrared spectrum of the polymer, in the doped state, obtained in Example 1 according to the present invention.

An infrared spectrum of this composition is shown in FIG. 4.

Figure 5:
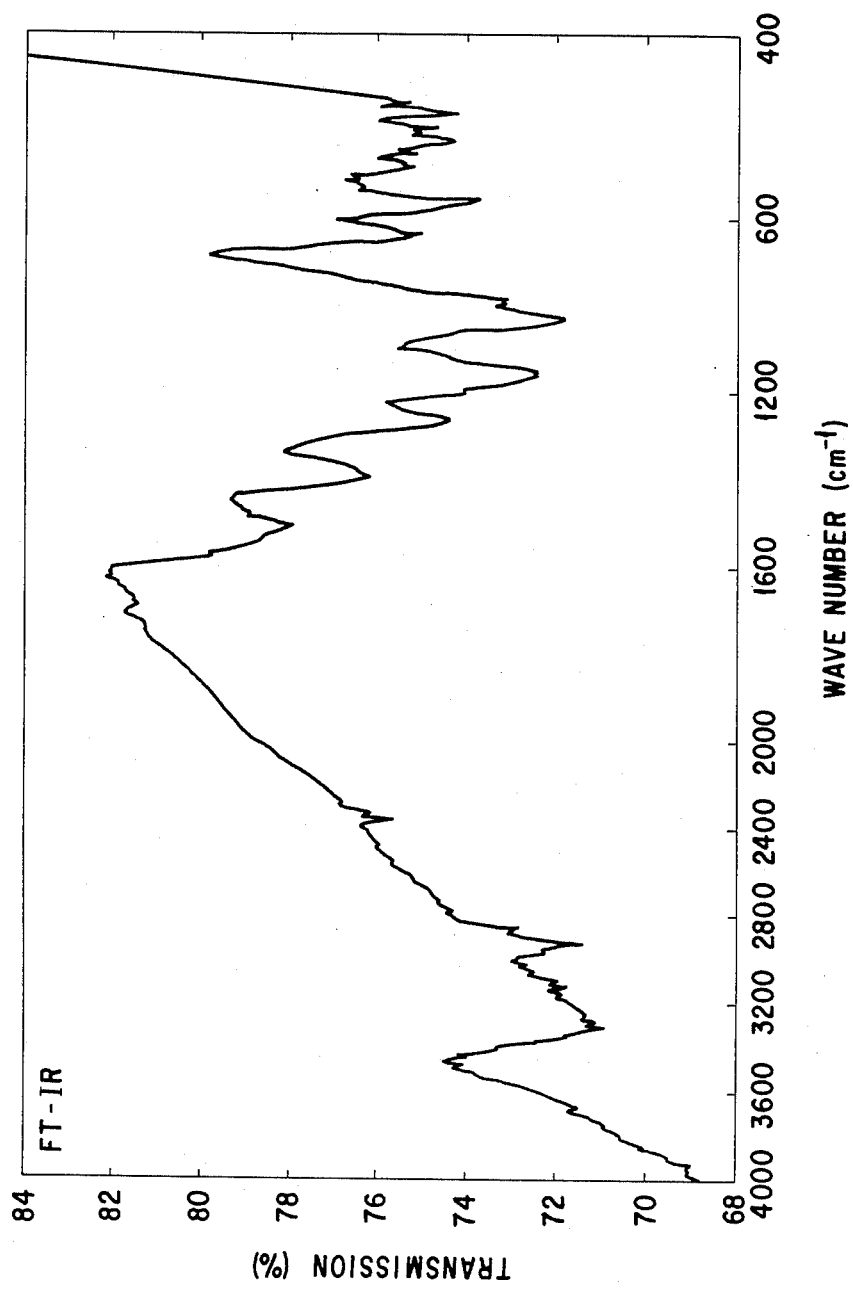
FIG. 5 shows an infrared spectrum of the polymer, in the neutral state, obtained in Example 1 according to the present invention.

The foregoing film, held by an electric conductive clip, was immersed in an acetonitrile solution containing 0.1 M tetra-n-butylammonium hydrogensulfate and the electrode reduction was conducted, using a platinum plate as a counter electrode. An infrared spectrum of the film converted to the neutral state is shown in FIG. 5.

With respect to the neutral film (FIG. 5), the absorption at 1520 cm$^{-1}$ and 1400 cm$^{-1}$ and their intensities indicate highly conjugated effect of a thiophene ring and a pyrrole ring. The absorption at 850 cm$^{-1}$, 770 cm$^{-1}$, 690 cm$^{-1}$ and 640 cm$^{-1}$, which is derived from the substitution manner of a thiophene ring and a pyrrole ring, strongly indicates the bonds at the 2- and 2'-positions and the 5- and 5'- positions, respectively. That is to say, poly (2,2'-thienyl pyrrole) prepared as described above is proved to be a polymer in which a thiophene ring is bonded to a pyrrole ring at the 2-, and 2'- positions and the 5- and 5'- positions, respectively.

When the polymer contains hydrogensulfate ions as the dopant, a remarkable improvement of the electric conductivity is observed, compared with 0.3 ($\Omega \cdot$cm)$^{-1}$ in polypyrrole (M. Salmon et al., Mol. Cryst. Lig. Cryst. 83, 265 [1982]) and 0.1 ($\Omega \cdot$cm)$^{-1}$ in polythiophene (R. J. Waltman et al., J. Phys. Chem. 87, 1459 [1983]). As to the infrared spectrum of the doped film (FIG. 4), the broad absorption at 1700 cm$^{-1}$ to 1500 cm$^{-1}$ strongly shows a structure wherein many double bonds are conjugated. The absorption at 1420 cm$^{-1}$ characteristically shows that the double bond exsists, and the absorption at 790 cm$^{-1}$ characteristically indicates it to be a ring compound.

Namely, the doped film is considered to be a polymer substantially constituted of the following structure:

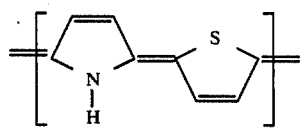

It is strongly indicated from this experimental result that such a structure can be given in the doped state (oxidized state) by assuming the repeat units in which a thiophene ring and a pyrrole ring have bonding hands at the 5- and 5'- positions, respectively.

As described above, it was confirmed by the ultraviolet absorption spectra, the infrared absorption spectra and the electric conductivity that the polymer composition of the present invention was the five-membered heterocyclic polymer constituted of the repeat units wherein a thiophene ring was directly bonded to a pyrrole ring at the 2- and 2'- positions and both rings had bonding hands at the 5- and 5'- positions, respectively.

COMPARATIVE EXAMPLE 1

According to Japanese Provisional Patent Publication No. 58-187432/1983, 1 g of 2,2'-thienylpyrrole or 2-(2-pyrrolyl)-thiophene and 0.1 g of magnesium perchlorate were dissolved in 100 ml of diethyl sulfate. The electric current was passed in this solution for 30 minutes under the electrolytic oxidation condition that the interelecteode voltage is 200V and the current density is 1 mA/cm$^2$, using platinum plates as an anode and a cathode. Thus, a polymer composition was obtained on the anode. This composition was washed with methanol, and thereafter dried for a day. Four samples 110 mm long and 15 mm wide were prepared and subjected to electric conductivity measurement by the four probe technique. Consequently, an averaged value of $2.6 \times 10^{-1}$ $(\Omega \cdot cm)^{-1}$ was obtained.

COMPARATIVE EXAMPLE 2

According to Japanese Provisional Patent Publication No. 58-196233/1983, 1 g of 2.2'-thienylphrrole or 2-(2-pyrrolyl)-thiophene and 0.1 g of magnesium perchlorate were dissolved in 100 ml of diethyl sulfate. Using an electrode which was prepared by evaporating onto a glass surface the oxides of indium and tin, one of the substrates (metal oxide semiconductors or thin filmform metals supported by the substrates) described in Japanese Provisional Patent Publication No. 58-213027/1983, the electrolytic oxidation was carried out, filling with an inert gas, argon, described in Japanese Provisional Patent Publication No. 59-210947/1984. Thus, a polymer composition was obtained on the anode. The electric conductivity of this composition was measured in the same manner as in Comparative Example 1. Consequently, an electric conductivity of $2.6 \times 10^{-1}$ $(\Omega \cdot cm)^{-1}$ was obtained.

COMPARATIVE EXAMPLE 3

According to M. Salmon et al., Mol. Cryst. Liq. Cryst. 83, 265 (1982), the electrolytic oxidative polymerization of pyrrole was conducted in the presence of perchlorate ions. The product shows an electric conductvity of 97 $(\Omega \cdot cm)^{-1}$.

COMPARATIVE EXAMPLE 4

According to S. Tanaka et al., Makromol. Chem. 185, 1295 (1984), the electrolytic oxidative polymerization of thiophene was conducted in the presence of perchlorate ions. As a consequence, a film having an electric conductivity of 21 $(\Omega \cdot cm)^{-1}$ was obtained.

The composition obtained in Comparative Example 1 contains perchlorate ion as the dopant. The dopant dependence of the electric conductivity is shown in M. Salmon et al., Mol. Cryst. Liq. Cryst. 83, 265 (1982) and the like. It is well known that perchlorate ion is the dopant providing good electric conductivity to an electrolytic oxidation polymerization composition such as polypyrrole or polythiophene.

However, the electric conductivity of the compositions obtained in Comparative Examples 1 and 2 is only about 1/100 to 1/400 of that of polypyrrole and polythiophene obtained in Comparative Examples 3 and 4. It is understandable without difficulty and well known that the structural defect, for example a bond at the 3- and 4- positions in polypyrrole and the like, causes a lowering of the electric conductivity.

In Example 1 of the present invention, nitrobenzene, tetra-n-butylammonium hydrogensulfate and an interelectrode voltage of 6V are used as a solvent, a supporting electrolyte and an electrolytic condition, respectively. In contrast, in Comparative Examples 1 and 2, diethyl sulfate, magnesium perchlorate and particularly an interelectrode voltage of 200 V are used. In Comparative Examples 1 and 2, therefore, it is considered that the compositions having structures different from that of the composition of the present invention are formed.

In order to show that the polymer of the present invention is substantially constituted of the repeat units in which a thiophene ring is directly bonded to a pyrrole ring at the 2- and 2'- positions and both rings have the bonding hands at the 5- and 5'- positions, respectively, the present invention will further be described in detail with reference to Example 2, showing the results of electro-chemical analysis.

EXAMPLE 2

Figure 6:
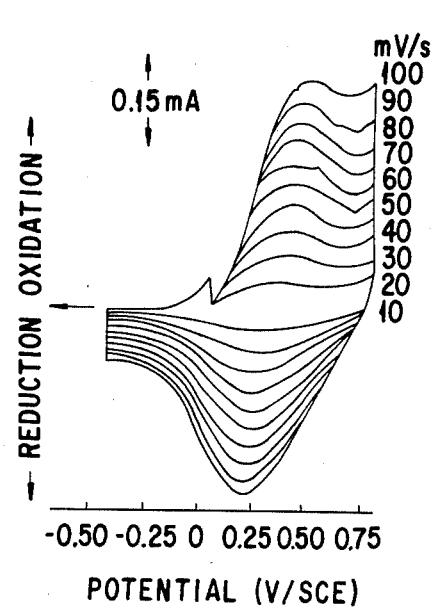
FIG. 6 shows cyclic voltammogram in electrochemical analysis of the polymer according to the present invention.
Figure 7:
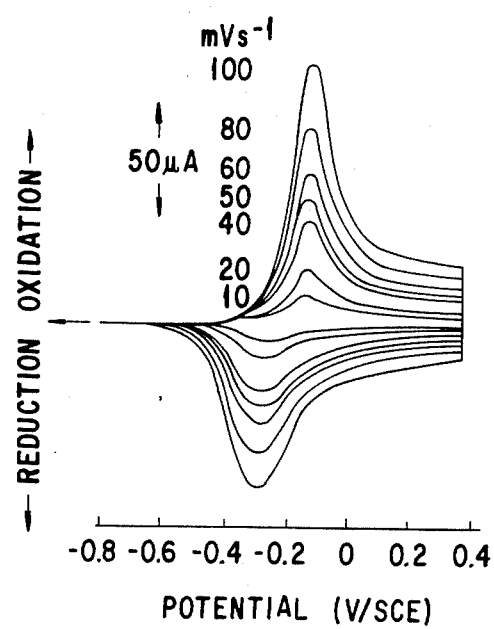
FIGS. 7 and 8 show cyclic voltammogram in electrochemical analysis of polypyrrole and polythiophene, respectively.
Figure 8:
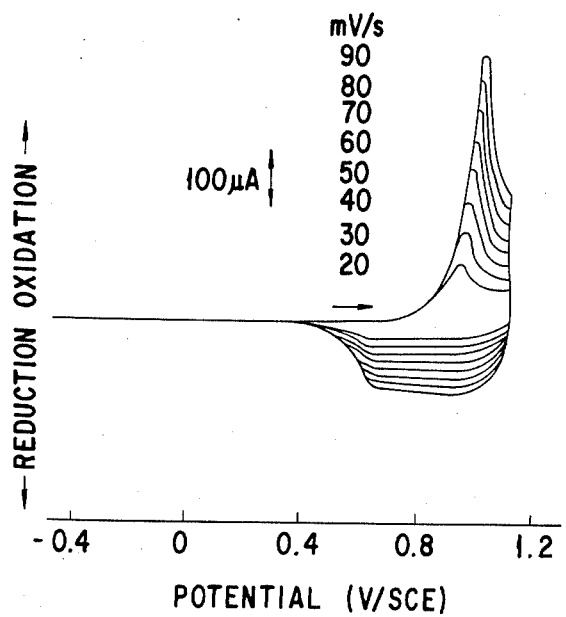

A nitrobenzene solution of 2,2'-thienylpyrrole and tetra-n-butylammonium hydrogensulfate, prepared in concentrations of 0.03M and 0.1M respectively, was placed in the anode side of a two-compartment electrolytic cell and a nitrobenzene solution containing 0.1M tetra-n-butylammonium hydrogensulfate was placed in the cathode side. Then inert gas (nitrogen, argon or helium) was introduced therein. As an anode, a platinum electrode of 1 cm$^2$ having the surface specularly polished was used. The electric current was passed in the solution, until a quantity of electricity of 30 mC/cm$^2$ was reached, whereby a thin film having a thickness of about 0.1 $\mu$m was synthesized on the platinum electrode. This electrode was subjected to the electrolytic reduction in an acetonitrile solution containing 0.1M tetra-n-butylammonium hydrogensulfate in the same manner as in Example 1 to be converted to the neutral state. Using this product as a working electrode, a coil-shaped platinum wire as a counter electrode, and a saturated calomel electrode (SCE) as a reference electrode, the electrochemical analysis was carried out in an acetonitrile solution containing 0.1M tetra-n-butylammonium between $-0.50V$ and $+0.75V$. The result is shown in FIG. 6. FIGS. 7 and 8 show examples reported for polypyrrole and polythiophene (A. F. Diaz et al., J. Chem. Soc. Chem. Comminu. 397 [1980]; R. J. Waltman et al., J. Phys. Chem. 87, 1459 [1983]). The reduction potential of poly (2,2'-thienylpyrrole) shown in FIG. 6 is shifted to $+0.25V$, compared with that of polypyrrole shown in FIG. 7, which is $-0.3V$. The oxidation potential of poly (2,2'-thienylpyrrole) shown in FIG. 6 is shifted to $+0.5V$, compared with that of polythiophene shown in FIG. 8, which is 1.0V. It is evident from these facts that poly (2,2'-thienylpyrrole) is stable in the atmosphere and its doping is reversible. The characteristics described above indicate that the composition thus obtained is a polymer having minor structural defect, namely constituted of the repeat units in which a thiophene ring is directly bonded to a pyrrole ring at the 2- and 2'- positions and both rings have the bonding hands at the 5- and 5'-positions.

As described above, it will be readily understandable that the polymer according to the present invention is remarkably stable, compared with the conventional known organic electric conductive materials.

What is claimed is:

1. A five-membered heterocyclic compound polymer substantially constituted of repeat units represented by the following general formula wherein a thiophene ring is directly bonded to a pyrrole ring at the 2- and 2'-positions, respectively:

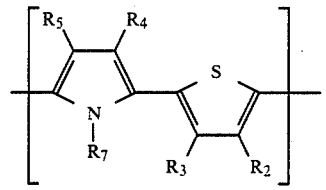

wherein each of $R_2$, $R_3$, $R_4$, $R_5$ and $R_7$ is selected from the group consisting H, alkyl, halogen, hydroxyl, carboxyl or a salt thereof, aryl and aralkyl groups.

2. A five-membered heterocyclic compound polymer as claimed in claim 1, wherein $R_2$, $R_3$, $R_4$, $R_5$ and $R_7$ are hydrogen atoms.

* * * * *